United States Patent
Chen et al.

(10) Patent No.: US 8,927,859 B2
(45) Date of Patent: Jan. 6, 2015

(54) ELECTRONIC DEVICE AND CASE SET DETACHMENT STRUCTURE THEREOF

(71) Applicant: Wistron Corporation, New Taipei (TW)

(72) Inventors: Kuang-Wen Chen, New Taipei (TW); Chun-Chiang Lai, New Taipei (TW); Yu-Hsin Huang, New Taipei (TW); Fu-Chien Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 127 days.

(21) Appl. No.: 13/683,260

(22) Filed: Nov. 21, 2012

(65) Prior Publication Data

US 2014/0027449 A1    Jan. 30, 2014

(30) Foreign Application Priority Data

Jul. 25, 2012   (TW) .............................. 101126833 A

(51) Int. Cl.
*H02G 3/08*    (2006.01)
*G06F 1/16*    (2006.01)
*G06F 1/18*    (2006.01)

(52) U.S. Cl.
CPC ................ *G06F 1/16* (2013.01); *G06F 1/1656* (2013.01); *G06F 1/181* (2013.01); *Y10S 248/906* (2013.01)
USPC ... 174/50; 248/906; 361/679.01; 361/679.33; 439/535

(58) Field of Classification Search
USPC ............ 174/50; 248/906; 439/535; 220/4.02; 361/679.01, 679.33, 679.47
See application file for complete search history.

(56) References Cited

U.S. PATENT DOCUMENTS

| | | | |
|---|---|---|---|
| 7,561,419 B2 | 7/2009 | Lee et al. | |
| 7,775,816 B1 * | 8/2010 | Huang et al. | 439/159 |
| 8,564,948 B2 * | 10/2013 | Li | 361/679.47 |
| 8,611,085 B2 * | 12/2013 | Guo | 361/679.58 |
| 2011/0061885 A1 | 3/2011 | Wilson | |

FOREIGN PATENT DOCUMENTS

TW   M416299 U1   11/2001

* cited by examiner

*Primary Examiner* — Dhirubhai R Patel
(74) *Attorney, Agent, or Firm* — Muncy, Geissler, Olds & Lowe, P.C.

(57) ABSTRACT

An electronic device includes a case set and a case set detachment structure. The case set includes a first case with a plurality of fastening parts, and a second case with a plurality of fastening corresponding parts. The case set detachment structure includes a connecting board, a detachment rod, and an oblique stand. The connecting board is located on the first case and includes a moving part. The detachment rod includes a rod part, a moving corresponding part, and an oblique plate. The moving corresponding part is located on the rod part and is movably connected to the moving part. The oblique plate is connected to the rod part, such that the oblique plate and the rod part form an angle. The oblique stand is located on the second case and corresponds to the detachment rod, which includes an oblique surface.

10 Claims, 7 Drawing Sheets

ELECTRONIC DEVICE AND CASE SET DETACHMENT STRUCTURE THEREOF

BACKGROUND OF THE INVENTION

1. Field of the Invention

The present invention relates to a case set detachment structure; more particularly, the present invention relates to a case set detachment structure for disassembling an electronic device.

2. Description of the Related Art

As technology develops, consumers have more and more requirements for the features and the appearance of the computer. Therefore, the AIO computer (All In One, AIO), which has the multimedia function and combines the screen and the host, is popular with the consumers. The common case set structure of the AIO computer is designed as a front case and a back case. The internal system elements are located between the front case and the back case. The front case and the back case are fastened via some screws and screw holes.

Therefore, during the assembly or the disassembly process of the AIO computer, the screws must be assembled or disassembled in advance of assembling or disassembling the case set. For the common AIO computer, the process of the assembly or the disassembly of the AIO computer entails human and time costs for assembling or disassembling the screws. The screws for fastening the front case and the back case of the AIO computer also entail a material cost. Furthermore, since the front case and the back case of the AIO computer are fastened by screws, the case set structure of the AIO computer must have screw holes, such that the appearance of the AIO computer is limited.

Therefore, there is a need to provide a new case set detachment structure. The new case set detachment structure can reduce both the cost of the materials of the electronic device and the assembly time.

SUMMARY OF THE INVENTION

It is an object of the present invention to provide a case set detachment structure for disassembling an electronic device.

To achieve the abovementioned object, the electronic device of the present invention includes a case set and a case set detachment structure. The case set includes a first case with a plurality of fastening parts, and a second case with a plurality of fastening corresponding parts. The case set detachment structure includes a connecting board, a detachment rod, and an oblique stand. The connecting board is located on the first case and includes a moving part. The detachment rod includes a rod part, a moving corresponding part, and an oblique plate. The moving corresponding part is located on the rod part and is movably connected to the moving part. The oblique plate is connected to the rod part such that the oblique plate and the rod part form an angle between the oblique plate and the rod part. The oblique stand is located on the second case and corresponds to the detachment rod, which includes an oblique surface.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only, and not as a definition of the invention.

Figure 1:
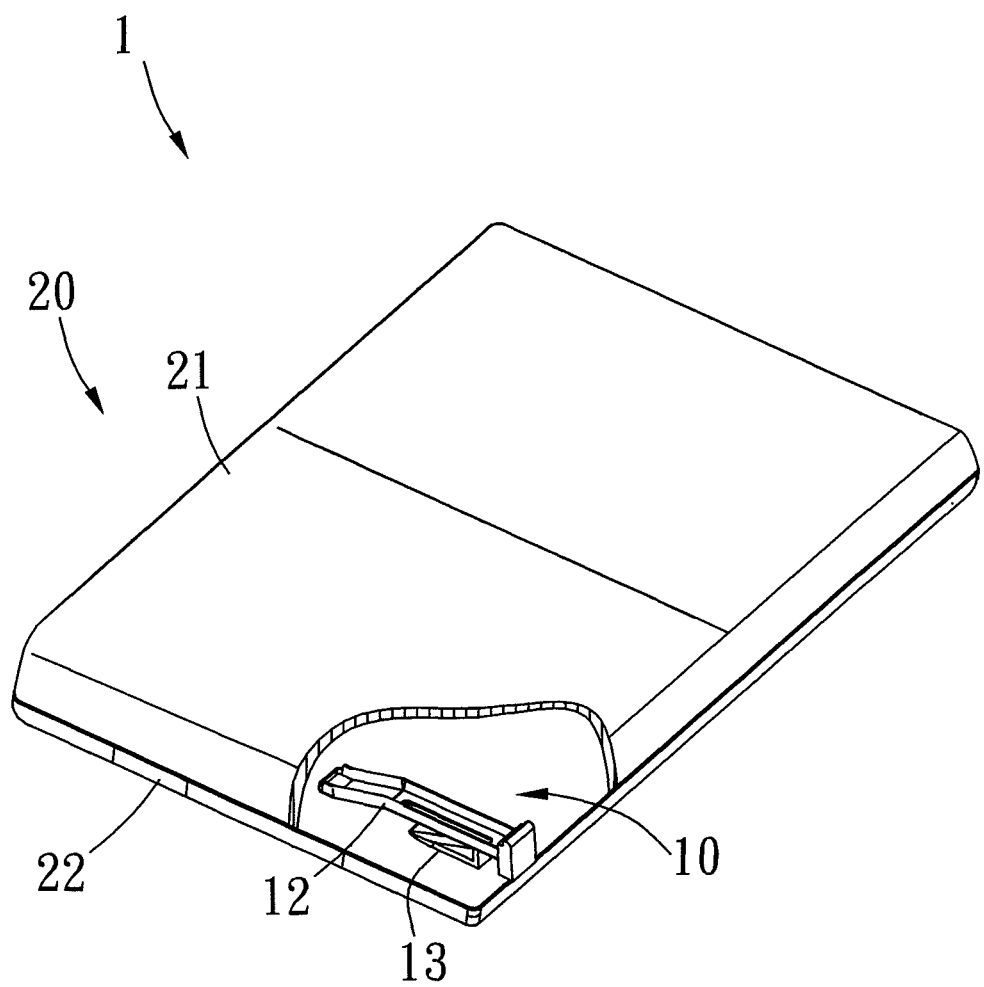
FIG. 1 illustrates a schematic drawing of the electronic device according to the first embodiment of the invention.
Figure 2:
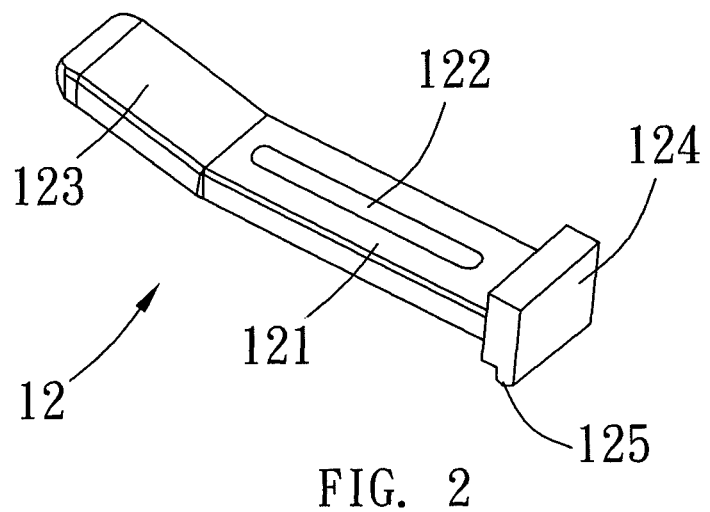
FIG. 2 illustrates a schematic drawing of the detachment rod of the case set detachment structure according to the first embodiment of the invention.
Figure 3:
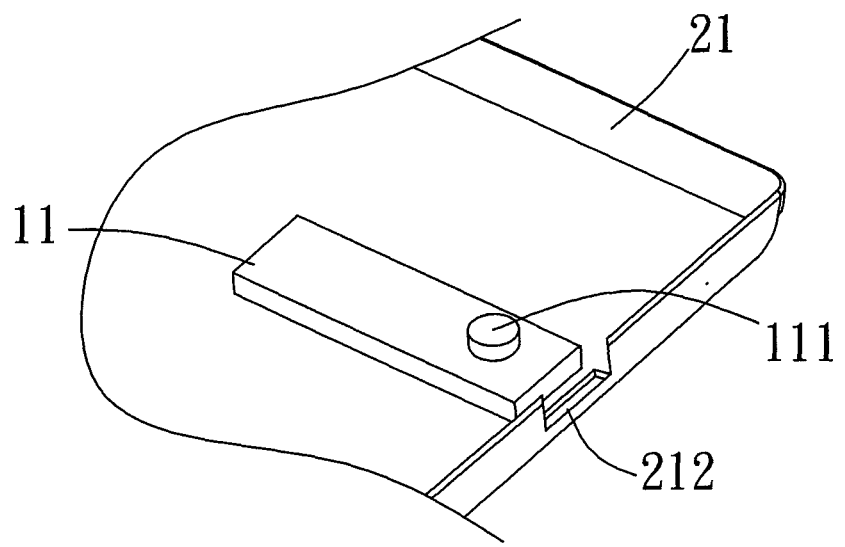
FIG. 3 illustrates a schematic drawing of the connecting board of the case set detachment structure according to the first embodiment of the invention.
Figure 4:
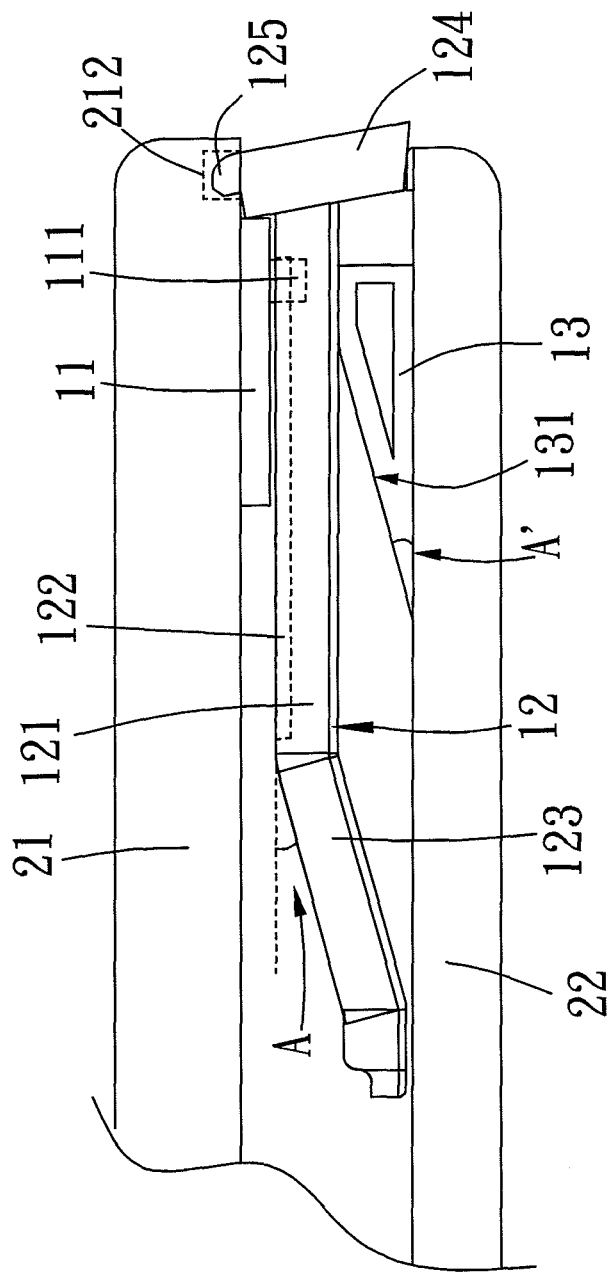
FIG. 4 illustrates a cross-sectional drawing of the case set detachment structure in the common state according to the first embodiment of the invention.
Figure 5:
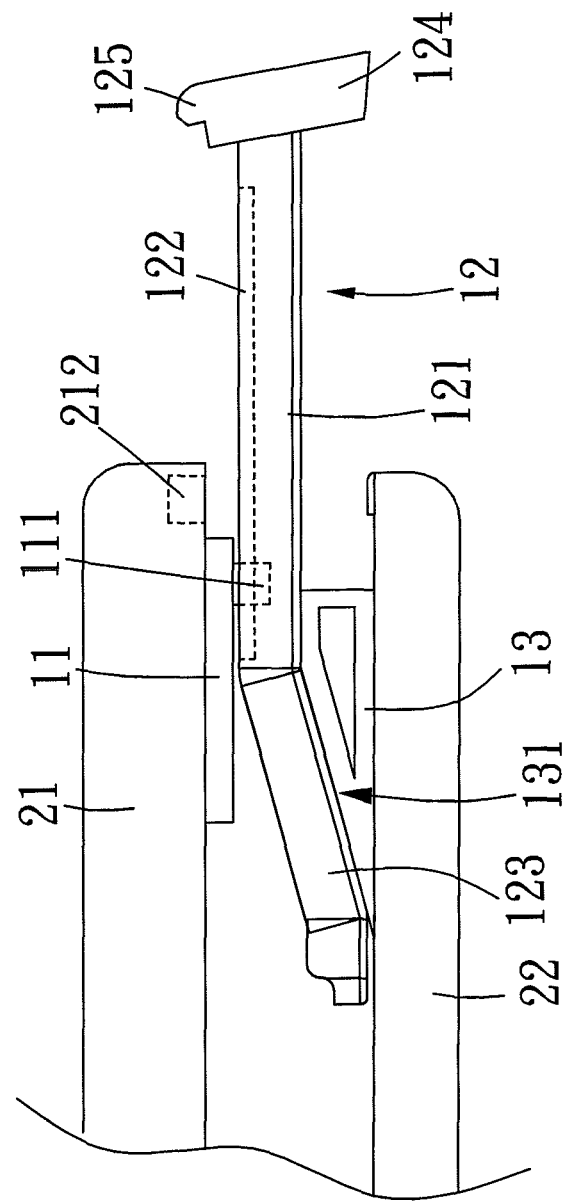
FIG. 5 illustrates a cross-sectional drawing of the case set detachment structure in the disassembly state according to the first embodiment of the invention.
Figure 6:
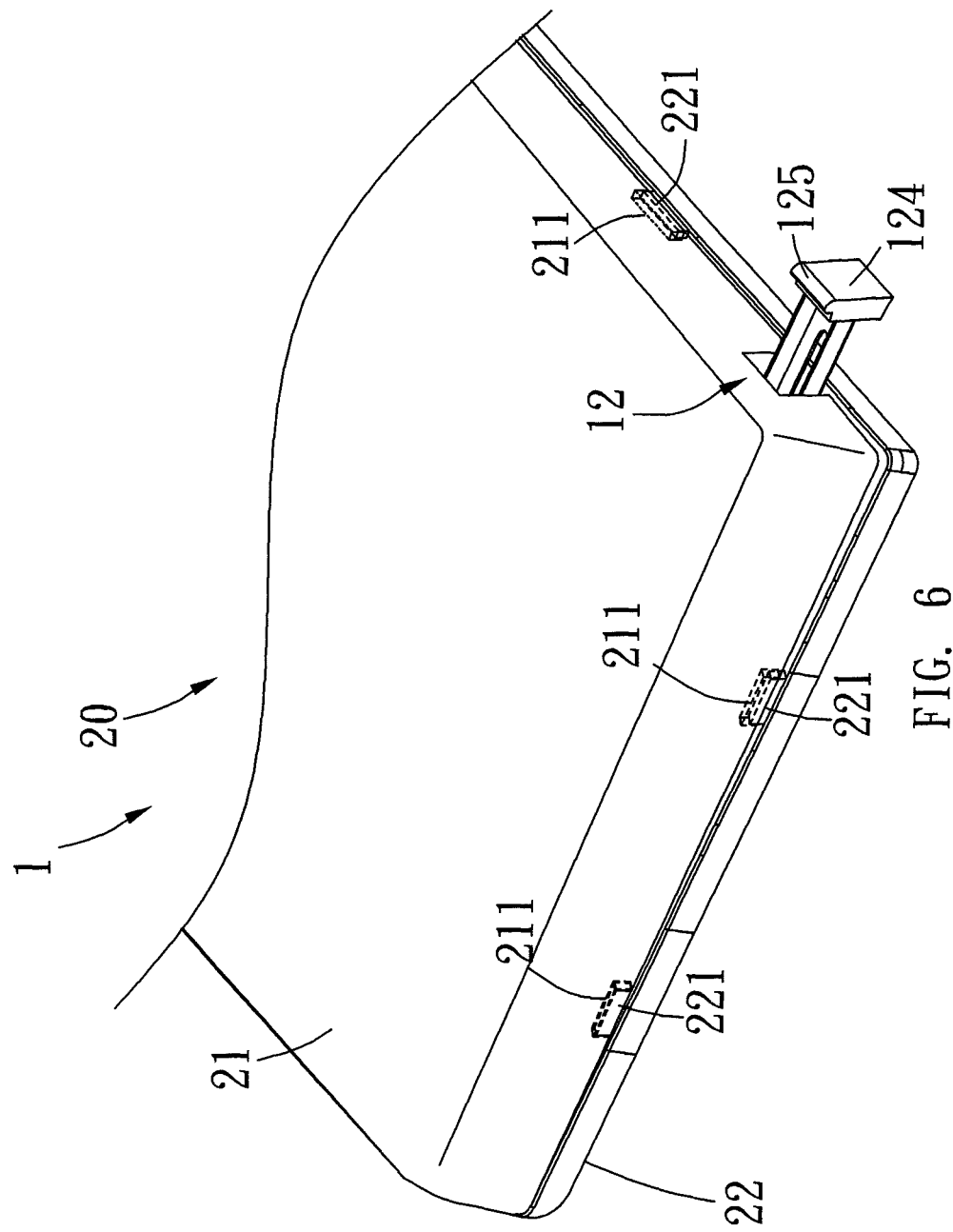
FIG. 6 illustrates a schematic drawing of the electronic device in the disassembly state according to the first embodiment of the invention.
Figure 7:
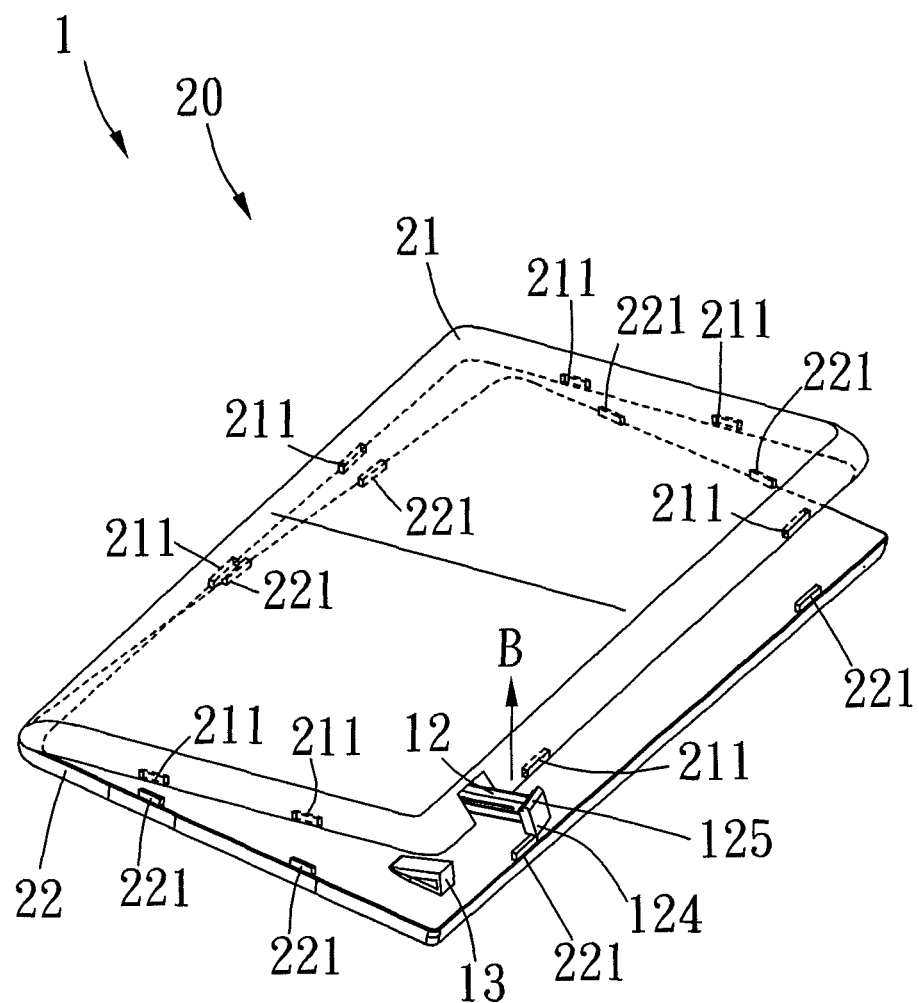
FIG. 7 illustrates a schematic drawing of the disassembled electronic device according to the first embodiment of the invention.

Please refer to FIG. 1 to FIG. 7 for the first embodiment of the invention. FIG. 1 illustrates a schematic drawing of the electronic device according to the first embodiment of the present invention. FIG. 2 illustrates a schematic drawing of the detachment rod of the case set detachment structure according to the first embodiment of the=invention. FIG. 3 illustrates a schematic drawing of the connecting board of the case set detachment structure according to the first embodiment of the=invention. FIG. 4 illustrates a cross-sectional drawing of the case set detachment structure in the common state according to the first embodiment of the=invention. FIG. 5 illustrates a cross-sectional drawing of the case set detachment structure in the disassembly state according to the first embodiment of the=invention. FIG. 6 illustrates a schematic drawing of the disassembly state of the electronic device according to the first embodiment of the=invention. FIG. 7 illustrates a schematic drawing of the disassembled electronic device according to the first embodiment of the=invention.

As shown in FIG. 1, FIG. 4, and FIG. 7, in the first embodiment, the electronic device 1 of the present invention is an AIO (All In One) computer, but the present invention is not limited to that design; the electronic device 1 can be a notebook computer, a tablet personal computer, or another similar device. The electronic device 1 comprises a case set 20 and a case set detachment structure 10. The case set 20 comprises a first case 21 and a second case 22. The first case 21 comprises eight fastening parts 211 and a detachment rod fastening corresponding part 212. The second case 22 comprises eight fastening corresponding parts 221. The amount and the position of the fastening part 211 of the first case 21 correspond to the fastening corresponding part 221 of the second case 22, such that every fastening part 211 can be fastened to the corresponding fastening corresponding part 221, allowing the first case 21 and the second case 22 to be fastened. In the present invention, the fastening part 211 of the first case 21 and the detachment rod fastening corresponding part 212 are notches, and the fastening corresponding part 221 of the second case 22 is a hook. However, the present invention is not limited to the abovementioned description; for example, the amount of the fastening parts 211 and the fastening corresponding parts 221 are not limited to eight, and the amount can be changed according to the design requirement; also, the type of the fastening part 211 and the fastening corresponding part 221 are not limited to the notch and the hook, and the fastening part 211 and the fastening corresponding part 221 can be other elements with a fastening function, such as a buckle.

In the first embodiment of the present invention, the case set detachment structure 10 is located between the first case 21 and the second case 22 for detaching the first case 21 and the second case 22, which are fastened to each other. The case set detachment structure 10 comprises a connecting board 11, a detachment rod 12, and an oblique stand 13. As shown in FIG. 3, the connecting board 11 of the present invention is located on the first case 21, and the connecting board 11 comprises a moving part 111. The moving part 111 is a convex column, but the structure of the moving part 111 of the present invention is not limited to the convex column. The connecting board 11 is made of metal, such as iron or aluminum, but the material of the connecting board 11 of the present invention is not limited to that design.

As shown in FIG. 2 and FIG. 4, in the first embodiment, the detachment rod 12 comprises a rod part 121, a moving corresponding part 122, an oblique plate 123, a grip 124, and a detachment rod fastening part 125. The moving corresponding part 122 of the present embodiment is a chute, but the structure of the moving corresponding part 122 of the present invention is not limited to the chute. The moving corresponding part 122 is located on the rod part 121 and is movably connected to the convex column of the moving part 111. Via the movable connection between the chute of the moving corresponding part 122 and the convex column of the moving part 111, the detachment rod 12 can move along a specific direction; in the present embodiment, the detachment rod 12 moves along the chute of the moving corresponding part 122. The oblique plate 123 is connected to the rod part 121, such that an angle A is formed between the oblique plate 123 and the rod part 121 (as shown in FIG. 4). The angle A is 15°, but the angle A is not limited to that design. The grip 124 is located on one end of the rod part 121. The end is relative to the oblique plate 123, allowing the user to hold the grip 124 to push the detachment rod 12 to move. The detachment rod fastening part 125 is located on the grip 124, and the detachment rod fastening part 125 is a hook. The detachment rod 12 is made of metal, such as iron or aluminum, but the material of the detachment rod 12 of the present invention is not limited to that design.

As shown in FIG. 1 and FIG. 4, in the first embodiment, the oblique stand 13 of the present invention is located on the second case 22, and the position of the oblique stand 13 is corresponded to the detachment rod 12. The oblique stand 13 comprises an oblique surface 131. As shown in FIG. 4, the angle A' between the oblique surface 131 and the second case 22 corresponds to the angle A between the oblique plate 123 and the rod part 121. In the embodiment of the present invention, the angle A' between the oblique surface 131 and the second case 22 is 15°, but angle A' is not limited to that design.

In the embodiment of the present invention, via a relative position between the moving part 111 and the moving corresponding part 122, the detachment rod 12 can be in two states:

Containing state: the moving corresponding part 122 is moved towards the inside of the case set 20, allowing the detachment rod 12 to be moved towards the inside of the case set 20, until the rod part 121 of the detachment rod 12 is contained in the case set 20 (as shown in FIG. 4).

Disassembly state: the moving corresponding part 122 is moved towards the outside of the case set 20, allowing the detachment rod 12 to be moved towards the outside of the case set 20, until the oblique plate 123 touches the oblique surface 131 of the oblique stand 13 (as shown in FIG. 5).

As shown in FIG. 4, in the embodiment of the present invention, when the first case 21 is fastened to the second case 22, and the detachment rod 12 is in the containing state, the oblique plate 123 of the detachment rod 12 does not touch the oblique surface 131 of the oblique stand 13; at this moment, the hook of the detachment rod fastening part 125 of the detachment rod 12 is fastened to the notch of the detachment rod fastening corresponding part 212 of the first case 21.

As shown in FIG. 5, in the embodiment of the present invention, when the user wants to detach the first case 21 and the second case 22 of the case set 20, the user must detach the detachment rod fastening part 125 from the detachment rod fastening corresponding part 212, allowing the detachment rod 12 to be detached from the fastening corresponding part 212 to move; then the user can hold the grip 124 and push the detachment rod 12 towards the outside of the case set 20. When the user pushes the detachment rod 12 towards the outside of the case set 20 until the oblique plate 123 touches the oblique surface 131 of the oblique stand 13, thus allowing the detachment rod 12 to be in the disassembly state, the force applied to the detachment rod 12 by the user will push the oblique stand 13 via the oblique plate 123. The oblique stand 13 has an angle A'; therefore, the force applied to the oblique stand 13 by the oblique plate 123 can be decomposed into a parallel force and a vertical force. The parallel force is parallel to the oblique surface 131 of the oblique stand 13, and the vertical force is vertical to the oblique surface 131. The vertical force works on the oblique plate 123 and the oblique stand 13, allowing the oblique plate 123 and the oblique stand 13 to be away from each other, such that the first case 21 and the second case 22 are also away from each other. As shown in FIG. 6, via the vertical force, the fastening part 211 of the first case 21 located around the case set detachment structure 10 can be detached from the corresponding fastening corresponding part 221 of the second case 22, allowing the first case 21 to be partly detached from the second case 22.

As shown in FIG. 7, when the first case 21 is partly detached from the second case 22, the user can hold the grip 124 and push the grip 124 along the disassembly direction B, which is away from the second case 22, allowing the eight fastening parts 211 of the first case 21 to be completely detached from the corresponding fastening corresponding parts 221 of the second case 22, such that the first case 21 can be completely detached from the second case 22, and the disassembly of the case set 20 can be completed.

In the embodiment of the present invention, if the user wants to assemble the case set 20 which is disassembled, the user needs only to push the detachment rod 12 towards the inside of the first case 21 of the case set 20 to prevent the oblique plate 123 of the detachment rod 12 from touching the oblique stand 13, and to form a vertical force which can cause the first case 21 and the second case 22 to be detached; then the user can align the fastening part 211 of the first case 21 to the fastening corresponding part 221 of the second case 22. Finally, the user can push the first case 21 to the second case 22, allowing the fastening part 211 of the first case 21 to fasten to the corresponding fastening corresponding part 221 of the second case 22, such that the assembly of the case set 20 is completed.

Figure 8:
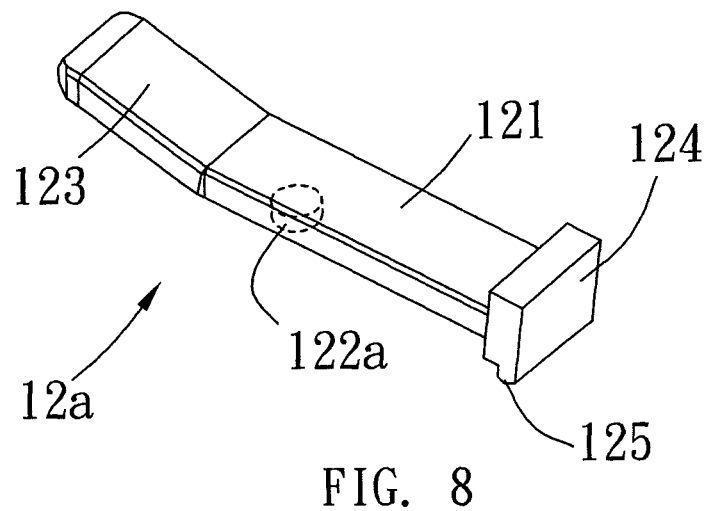
FIG. 8 illustrates a schematic drawing of the detachment rod of the case set detachment structure according to the second embodiment of the invention.
Figure 9:
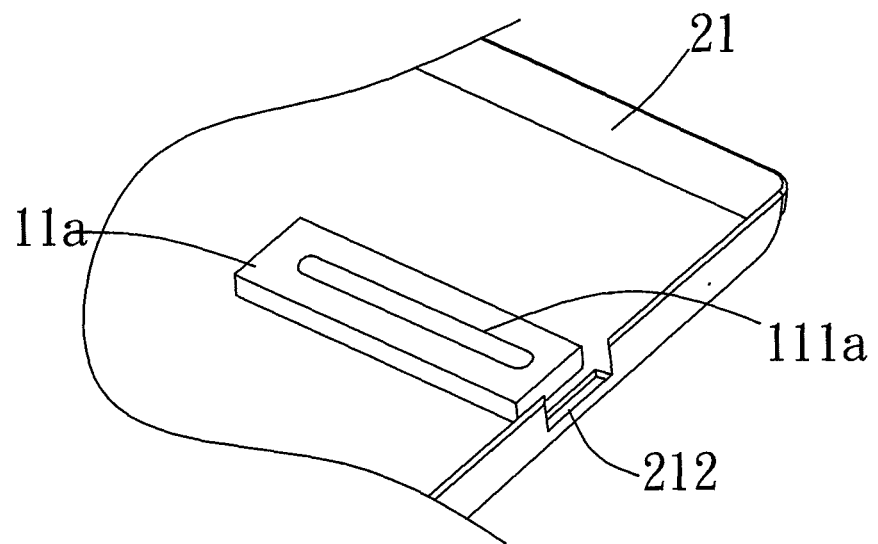
FIG. 9 illustrates a schematic drawing of the connecting board of the case set detachment structure according to the second embodiment of the invention.

Please refer to FIG. 8 and FIG. 9 for the second embodiment of the invention. FIG. 8 illustrates a schematic drawing of the detachment rod of the case set detachment structure according to the second embodiment of the invention. FIG. 9 illustrates a schematic drawing of the connecting board of the case set detachment structure according to the second embodiment of the invention.

As shown in FIG. 8 and FIG. 9, the difference between the second embodiment and the first embodiment of the present invention is that, in the second embodiment, the moving part 111a of the connecting board 11a is a chute, and the moving corresponding part 122a of the detachment rod 12a is a convex column. The convex column of the moving corresponding part 122a is movably connected to the chute of the moving part 111a. Via the movable connection between the convex column of the moving corresponding part 122a and the chute of the moving part 111a, the detachment rod 12a can move along a specific direction. In the embodiment of the present invention, the detachment rod 12a moves along the chute of the moving part 111a.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A case set detachment structure, applied to an electronic device; the electronic device comprises a case set, the case set comprises a first case and a second case, the first case comprises a plurality of fastening parts, the second case comprises a plurality of fastening corresponding parts, and an amount and a position of the plurality of fastening corresponding parts correspond to an amount and a position of the plurality of fastening parts, the case set detachment structure comprising:

a connecting board located on the first case, the connecting board comprising a moving part;

a detachment rod comprising a rod part, a moving corresponding part, and an oblique plate;

the moving corresponding part is located on the rod part and movably connected to the moving part; via a movable connection of the moving corresponding part and the moving part, the detachment rod moves along a specific direction; the oblique plate is connected to the rod part, and an angle is formed between the oblique plate and the rod part; and an oblique stand located on the second case, a position of the oblique stand corresponds to a position of the detachment rod, the oblique stand comprises an oblique surface, an angle between the oblique surface and the second case corresponds to the angle between the oblique plate and the rod part.

2. The case set detachment structure as claimed in claim 1, wherein via a relative position between the moving part and the moving corresponding part, the detachment rod can be in two states:

containing state: the moving corresponding part is moved towards an inside of the case set, allowing the detachment rod to be moved towards the inside of the case set, until the rod part of the detachment rod is contained in the case set; and disassembly state: the moving corresponding part is moved towards an outside of the case set, allowing the detachment rod to be moved towards the outside of the case set, until the oblique plate touches the oblique surface of the oblique stand.

3. The case set detachment structure as claimed in claim 2, wherein when the detachment rod is in the disassembly state, the fastening part located on the first case and near the case set detachment structure will be detached from the corresponding fastening corresponding part on the second case, allowing the first case to be partly detached from the second case.

4. The case set detachment structure as claimed in claim 3, wherein the detachment rod further comprises a grip and a detachment rod fastening part; the grip is located on one top of the rod part, the top is relative to the oblique plate, and the detachment rod fastening part is located on the grip; the first case further comprises a detachment rod fastening corresponding part; when the detachment rod is in the containing state, the detachment rod fastening part is fastened to the detachment rod fastening corresponding part.

5. The case set detachment structure as claimed in claim 4, wherein when the detachment rod is in the disassembly state, and the grip is pushed in a direction away from the second case, the plurality of fastening parts of the first case will be detached from the plurality of corresponding fastening corresponding parts of the second case, allowing the first case and the second case to be detached.

6. The case set detachment structure as claimed in claim 5, wherein the moving part is a chute, and the moving corresponding part is a convex column.

7. The case set detachment structure as claimed in claim 5, wherein the moving part is a convex column, and the moving corresponding part is a chute.

8. The case set detachment structure as claimed in claim 7, wherein the detachment rod fastening part is a hook, and the detachment rod fastening corresponding part is a notch.

9. The case set detachment structure as claimed in claim 8, wherein the angle between the oblique plate and the rod part is between 5° and 15°.

10. The case set detachment structure as claimed in claim 7, wherein the connecting board and the detachment rod are made of metal.

* * * * *